Oct. 30, 1962  J. A. SKUPAS ETAL  3,060,488
SEALED CASTER CONSTRUCTION
Filed June 5, 1961

INVENTORS
JOHN A. SKUPAS and
BY   IRVING STOLLMAN
*Lockwood, Woodard, Smith & Weikart*
Attorneys

3,060,488
SEALED CASTER CONSTRUCTION

John A. Skupas and Irving Stollman, Evansville, Ind., assignors to Faultless Caster Corporation, Evansville, Ind., a corporation of Indiana
Filed June 5, 1961, Ser. No. 114,715
6 Claims. (Cl. 16—18)

This invention relates generally to caster constructions and particularly to a sealed caster construction for use on furniture.

In designing casters for use on furniture several features assume particular importance. Among these are a pleasing aesthetic effect in over-all appearance of the caster and the sealing of the caster against the entry of dust, dirt and rug nap into the caster bearing areas. These features must be provided in a caster which can be manufactured at a relatively low cost and which lends itself to mass production techniques.

The caster of the present invention is composed of two, preferably die cast, halves, one of which accommodates a swivel stem and mounts a caster wheel axle. A caster wheel, forming the other of the die cast halves, is accommodated for rotation on the axle and the adjacent surfaces of the two halves are formed so as to cooperate with an O-ring or toroidally shaped elastic element to provide a seal at the adjacent surfaces of the caster halves.

The primary object of the present invention is to provide a caster construction in which an effective seal is provided the caster wheel and the stationary portion of the caster.

A further object of the present invention is to provide a caster construction of the type referred to in which the seal is effective even though the caster is subjected to prolonged use and suffers substantial wear.

A further object of the present invention is to provide a sealed caster of the type referred to which can be manufactured at relatively low cost.

These and other objects will become apparent as the description proceeds with reference to the accompanying drawings in which.

Figure 1:
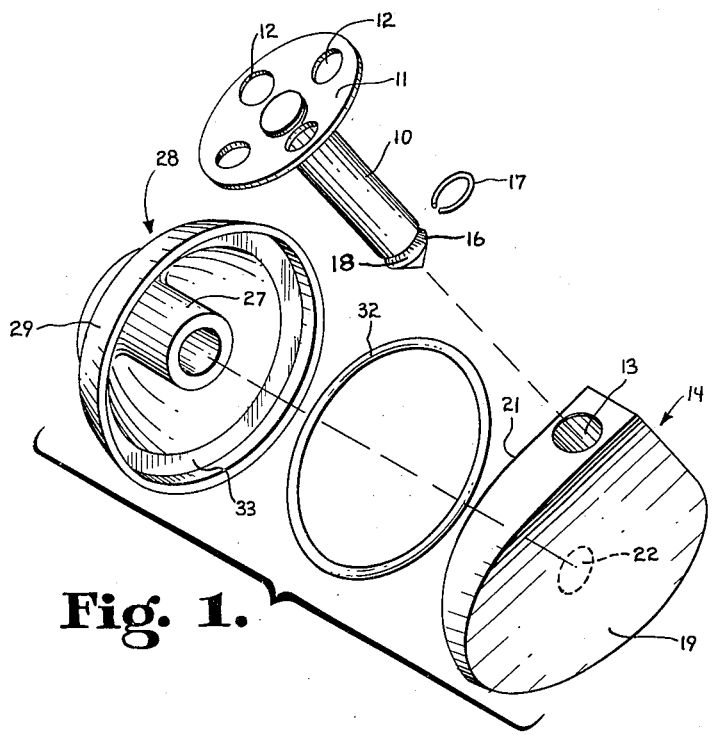
FIG. 1 is an exploded, perspective view of a caster embodying the present invention.

Referring to the drawings, the caster includes a swivel stem and mounting plate subassembly comprised of a swivel stem 10 rigidly secured at its upper end to a mounting plate 11. The mounting plate is provided with apertures 12 to facilitate fastening the plate to the furniture or other object which the caster is to support.

The stem 10 is accommodated within an aperture 13 in the non-rotating portion of the caster which takes the form of the base plate 14. The lower end of the stem is provided with a groove 16 which accommodates the steel expansion ring 17. The groove 16 has a chamfered surface 18 whose inclination is such that when a force is applied to the stem 10 which attends to remove it from the aperture 13 the chamfer 18 will expand the ring 17 and resist withdrawal of the stem 10 from the base 14. It will be understood that the fit between the stem 10 and the aperture 13 is such as to permit free swiveling of the plate 14 about the stem 10.

Figure 2:
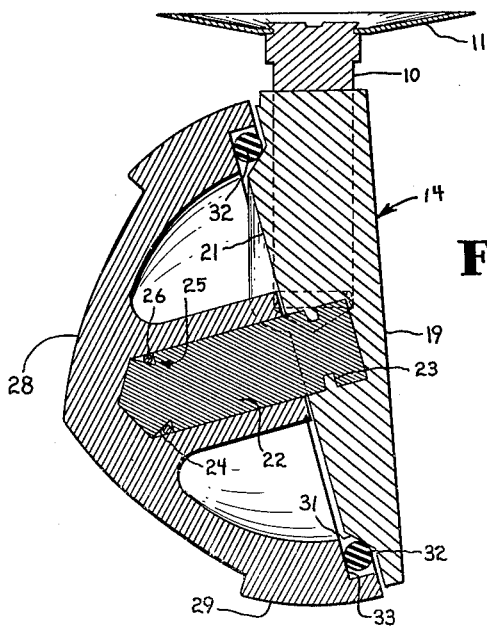
FIG. 2 is a side sectional view of the caster shown in FIG. 1 completely assembled.

As may best be seen in FIG. 2, while the side surface 19 of the plate or base 14 is somewhat outwardly inclined from top to bottom, the opposite side surface 21 of the base 14 is more sharply inclined inwardly from top to bottom and the plane of the inclined side surface 21 forms an acute angle with the axis of the swivel stem 10. Extending from and normal to the inclined face 21 is an axle 22. The axle is provided with a groove 23 at its inner end which accommodates material flowing therein upon casting of the base 14 to thereby rigidly secure the axle within the base. The outer end of the axle is provided with a groove 25 having a chamfer 24. The groove accommodates an expansion ring 26 which serves to hold the axle within the hub portion 27 of a generally cup-shaped wheel 28. The wheel 28 is provided with a somewhat domed configuration to provide a pleasing aesthetic effect and is further provided with an annular tread area 29 which contacts the floor or rug upon which the caster rests. It will be understood that the fit between the hub portion 27 and the axle 22 is such as to permit free rotation of the wheel upon the axle and withdrawal of the wheel from the axle is resisted by expansion of the ring 26 by the chamfered surface 24.

A seal is provided to prevent the entry of dirt, rug nap and the like into the interior of the caster and this sealing means includes an annular, inclined surface 31 formed at the peripheral area of the inclined face 21 of the plate or base 14. The inclination of the surface 31 is outwardly toward the axis of the axle 22. Accommodated upon the surface 31 is a toroidal, elastic member 32 of the type sometimes referred to as an "O-ring." The elastic member 32 is placed on the surface 31 under tensile stress so that the elastic member tends to relieve such stress by riding outwardly along the surface 31.

Such outward movement of the elastic member 32 is limited by its engagement with an annular surface 33 formed on the wheel 28 and extending normal to the axis of the axle 22.

In operation, the caster wheel 28 will roll freely about the axle 22 with its tread area 29 in contact with the floor or rug which serves as a supporting surface. The caster will be capable of swiveling about the stem 10. The action of the elastic member 32 in relieving its internal tensile stress will cause the member 32 to assume a position on the surface 31 at which it is in sealing contact with both the surface 31 and the annular surface 33 on the wheel. Any wear of the elastic member 32 or any small widening of the distance between the wheel and the stationary base or plate 14 will merely cause the elastic member to move further outwardly on the surface 31 while yet maintaining the seal between the surfaces 31 and 33. Any forces acting sidewardly upon the wheel will merely cause the elastic member to ride inwardly somewhat on the inclined surface 31 but the seal between the surfaces 31 and 33 will be maintained.

It will be understood that the caster wheel 28 and the base or plate 14 might be formed by die casting of either metal or plastic and that while the chamfered groove and expansion ring are shown as the means for retaining the wheel on the axle and for maintaining the plate 14 on the stem, other retaining means might be used. It should further be noted that while the groove 23 is provided at the inner end of the axle 22 to accommodate material from the plate 14, the axle might detachably be retained in the plate 14 by means of a removable clip extending through the base 14 and fitting into the groove 23 in the axle. It should also further be noted that, in applications where the presence of the seal feature is not required, the elastic member 32 may merely be omitted from the assembly without necessitating any substitution of other differently shaped parts.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed:
1. A caster comprising a base plate, a swivel stem extending from one margin of said plate and adapted for mounting to an object to be supported by said caster, one side face of said plate being inclined at an acute angle with the axis of said swivel stem, an axle extending from said inclined plate face and normal thereto, a cup-shaped wheel member received for rotation on said axle and overlying said inclined plate face, and means for sealing the area between the marginal area of said wheel and said inclined plate face comprising an annular inclined surface formed on said plate face, the inclination of said surface being outward and toward the axis of said axle, an annular surface formed on said wheel extending normal to the axis of said axle and adjacent said annular inclined surface, and a toroidal elastic member under tensile stress disposed around said annular inclined surface, the tendency of said elastic element to relieve its tensile stress causing it to move outwardly on said inclined annular surface and maintain itself in sealing engagement with said annular surface on said wheel.

2. A caster comprising a base plate member, a swivel stem extending from one margin of said plate member and adapted for mounting to an object to be supported by said caster, one side face of said plate member being inclined at an acute angle with the axis of said swivel stem, an axle extending from said inclined plate face and normal thereto, a wheel member received for rotation on said axle and overlying said inclined plate member face, and means for sealing the area between the marginal area of said wheel member and said inclined plate member face comprising an annular inclined surface formed on one of said members, the inclination of said surface being outward and toward the axis of said axle, an annular surface formed on the other of said members extending adjacent said annular inclined surface, and a toroidal elastic member under tensile stress disposed around said annular inclined surface, the tendency of said elastic element to relieve its tensile stress causing it to move outwardly on said inclined annular surface on said one member and maintain itself in sealing engagement with said annular surface on said other member.

3. A caster comprising a base plate, a swivel stem extending from one margin of said plate and adapted for mounting to an object to be supported by said caster, one side face of said plate being inclined at an acute angle with the axis of said swivel stem, an axle extending from said inclined plate face and normal thereto, a wheel member received for rotation on said axle and overlying said inclined plate face, and means for sealing the area between said wheel and said inclined plate face comprising an annular inclined surface formed on said plate face, the inclination of said surface being outward and toward the axis of said axle, an annular surface formed on said wheel extending normal to the axis of said axle and adjacent said annular inclined surface, and an elastic member under tensile stress disposed around said annular inclined surface, the tendency of said elastic element to relieve its tensile stress causing it to move outwardly on said inclined annular surface and maintain itself in sealing engagement with said annular surface on said wheel.

4. A caster comprising a base plate, a swivel stem extending from said plate and adapted for mounting to an object to be supported by said caster, one side face of said plate being inclined at an acute angle with the axis of said swivel stem, a wheel support member extending from said inclined plate face and normal thereto, a wheel member received for rotation on said wheel support member, and means for sealing the area between said wheel and said inclined plate face comprising an annular inclined surface formed on said plate, the inclination of said surface being outward and toward the axis of said wheel support member, an annular surface formed on said wheel extending normal to the axis of said wheel support member and adjacent said annular inclined surface and an elastic member under tensile stress disposed around said annular inclined surface, the tendency of said elastic element to relieve its tensile stress causing it to move outwardly on said inclined annular surface and maintain itself in sealing engagement with said annular surface on said wheel.

5. A caster comprising a base member, a swivel stem extending from said base member and adapted for mounting to an object to be supported by said caster, an axle extending from one side face of said base member, a wheel member received for rotation on said axle, and means for sealing the area between said wheel and said side face of the base member comprising an annular inclined surface formed on said base member side face, the inclination of said surface being outward and toward the axis of said axle, an annular surface formed on said wheel extending normal to the axis of said axle and adjacent said annular inclined surface, and an elastic member under tensile stress disposed around said annular inclined surface, the tendency of said elastic element to relieve its tensile stress causing it to move outwardly on said inclined annular surface and maintain itself in sealing engagement with said annular surface on said wheel.

6. A caster comprising a base member, a swivel stem extending from said base member and adapted for mounting to an object to be supported by said caster, an axle extending from one side face of said base member, a wheel member received for rotation on said axle, and means for sealing the area between said wheel and said side face of the base member comprising an annular inclined surface formed on one of said members an annular surface formed on said other member extending adjacent to said annular inclined surface, and an elastic member under tensile stress disposed around said annular inclined surface, the tendency of said elastic element to relieve its tensile stress causing it to move along said inclined annular surface on said one member and maintain itself in sealing engagement with said annular surface on said other member.

References Cited in the file of this patent

UNITED STATES PATENTS

| | | |
|---|---|---|
| 2,512,148 | Gaines | June 20, 1950 |
| 2,631,328 | Kramcsak | Mar. 17, 1953 |

FOREIGN PATENTS

| | | |
|---|---|---|
| 139,685 | Australia | Jan. 13, 1949 |